US009154447B2

(12) United States Patent
Zarrabi et al.

(10) Patent No.: US 9,154,447 B2
(45) Date of Patent: Oct. 6, 2015

(54) SYSTEM AND METHOD FOR STITCHING ETHERNET NETWORKS

(75) Inventors: Mazyar Zarrabi, Saint Louis, MO (US); Andrew V. Cook, Lenexa, KS (US); James Feger, Dardenne Prairie, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 238 days.

(21) Appl. No.: 12/913,540

(22) Filed: Oct. 27, 2010

(65) Prior Publication Data
US 2012/0106566 A1 May 3, 2012

(51) Int. Cl.
*H04L 12/46* (2006.01)
*H04L 12/931* (2013.01)
*H04L 29/06* (2006.01)

(52) U.S. Cl.
CPC ............... *H04L 49/35* (2013.01); *H04L 69/08* (2013.01); *H04L 12/4641* (2013.01)

(58) Field of Classification Search
CPC ..... H04L 12/4641; H04L 69/08; H04L 49/35; H04L 45/50; H04L 12/2898; H04L 12/4645; H04L 12/4691; H04L 12/465
See application file for complete search history.

(56) References Cited

U.S. PATENT DOCUMENTS

| | | | | |
|---|---|---|---|---|
| 8,724,456 | B1* | 5/2014 | Hong et al. | 370/225 |
| 2004/0174887 | A1* | 9/2004 | Lee | 370/395.53 |
| 2005/0053079 | A1* | 3/2005 | Havala | 370/400 |
| 2006/0109802 | A1* | 5/2006 | Zelig et al. | 370/258 |
| 2006/0190570 | A1* | 8/2006 | Booth et al. | 709/220 |
| 2006/0245436 | A1* | 11/2006 | Sajassi | 370/395.53 |
| 2007/0253432 | A1* | 11/2007 | Regale et al. | 370/395.53 |
| 2008/0101390 | A1* | 5/2008 | Hu | 370/401 |
| 2009/0041038 | A1* | 2/2009 | Martini et al. | 370/401 |
| 2009/0304003 | A1* | 12/2009 | Huynh Van et al. | 370/395.31 |
| 2009/0304004 | A1* | 12/2009 | Huynh Van et al. | 370/395.31 |
| 2010/0238808 | A1* | 9/2010 | Salam et al. | 370/241.1 |

* cited by examiner

*Primary Examiner* — Yee Lam
(74) *Attorney, Agent, or Firm* — Swanson & Bratschun, L.L.C.

(57) ABSTRACT

A system and method for stitching Ethernet networks. Communications are sent from a number of communications networks in one of two or more standards. The communications are converted from the two or more standards to a core standard. The communications are sent across a core network in communication with the number of communications networks utilizing the core standard. The communications are converted from the core standard to one of the two or more standards utilized by each of the number of communications networks receiving the communications in response to the communications reaching the number of communications networks.

17 Claims, 3 Drawing Sheets

SYSTEM AND METHOD FOR STITCHING ETHERNET NETWORKS

BACKGROUND

The use of and development of communications have grown nearly exponentially in recent years. The growth is fueled by larger networks with more reliable standards and protocols and better communications hardware available to both service providers and consumers. Despite many technological improvements, it is still difficult for service providers to effectively build national networks and link regional networks because of the incompatibility of standards, protocols, hardware, and vendor supplied software, systems, equipment, and devices.

SUMMARY

One embodiment includes a system and method for stitching Ethernet networks. Communications may be sent from a number of communications networks in one of two or more standards. The communications may be converted from the two or more standards to a core standard. The communications may be sent across a core network in communication with the number of communications networks utilizing the core standard. The communications may be converted from the core standard to one of the two or more standards utilized by each of the number of communications networks receiving the communications in response to the communications reaching the number of communications networks.

Another embodiment includes a system for Ethernet communications. The system may include a core network for sending communications. The system may further include a number of networks connected to the core network. The number of networks may utilize at least two or more standards. Communications from each of the number of networks are converted to a core format utilized to communicate through the core network. The communications are converted to one of the at least two or more standards associated with the one of the number of networks associated with a destination for each of the communications, respectively.

Yet another embodiment includes a core Ethernet network. The core Ethernet network may include a number of network devices. Each of the number of network devices may include a processor for executing a set of instructions and a memory for storing the set of instructions. The set of instructions may be configured to send communications from a number of communications networks in one of two or more standards, convert communications from the two or more standards to a core standard, send the communications across a core network in communication with the number of communications networks utilizing the core standard, convert the communications from the core standard to one of the two or more standards utilized by each of the number of communications networks receiving the communications in response to the communications reaching the number of communications networks.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Illustrative embodiments provide systems, computer-implemented methods, and networks for stitching together numerous networks to provide a national network providing efficient communications and allowing simplified expansion. The illustrative embodiments may be implemented for any number of different communications or network types. The illustrative embodiments stitch together networks using different standards for increasing the interoperability, expansion, efficiency, and effectiveness of interconnected networks. Different standards, protocols, platforms, architectures, formats, vendor solutions, mechanisms, software and applications, and other tangible or intangible elements utilized for communications and computing are herein referred to as standards.

The illustrative embodiments allow communications of multiple standards utilized by a number of regional metro Ethernet networks (or other network types) to be converted to a core standard utilized by the core network for communications through the core network. The core standard is then converted to the standard utilized by the regional metro Ethernet network to deliver each communication to a destination or receiving party. The conversion between standards may be performed by the core network or a device, system, or other portion of the core. The interoperability between a regional metro Ethernet network and the core network means that not all of the regional metro Ethernet networks have to interoperable or compatible because of their existing compatibility with the core network.

Figure 1:
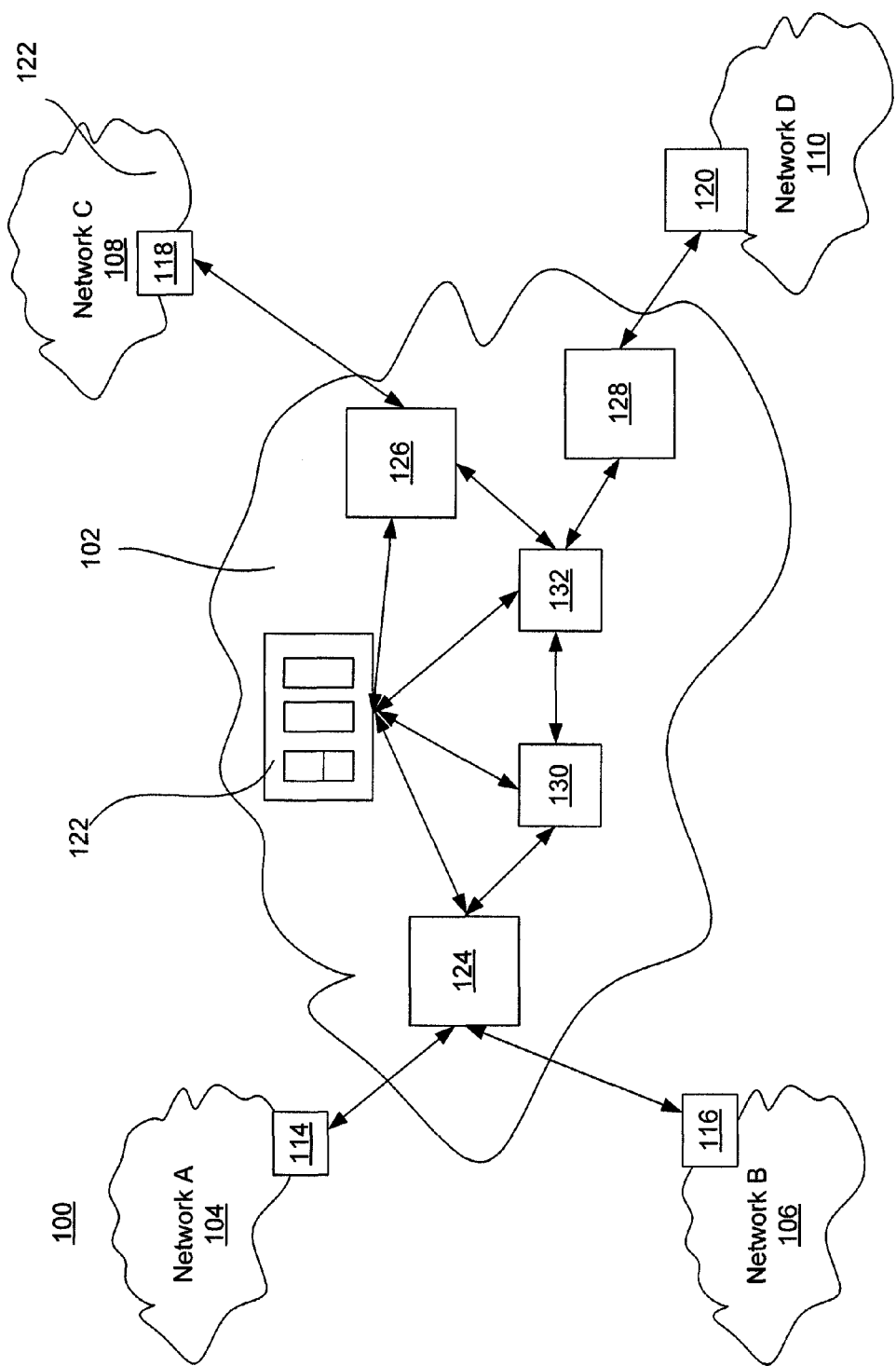
FIG. 1 is a pictorial representation of a national communications network in accordance with an illustrative embodiment.

FIG. 1 is a pictorial representation of a national communications network in accordance with an illustrative embodiment. In one embodiment, FIG. 1 describes a national communications network 100, environment, or system. For example, the national communications network 100 may be a national metro Ethernet network composed of regional metro Ethernet networks and a core network 102.

In one embodiment, the national communications network 100 may include the core network 102, network A 104, network B 106, network C 108, network D 110, interfaces 114, 116, 118, and 120, communications management system 122, and network devices 124, 126, 128, 130, and 132. Network A 104, network B 106, network C 108 and network D 110 may represent regional metro Ethernet networks each of which uses different communications standards.

The interfaces 114-120 are one or more network devices that interconnect networks A-D 104-110 with the core network 102. The interfaces 114-120 may represent servers, switches, routers, gateways or other network elements. The core network 102 may similarly include network devices 124, 126, and 128 that interface with the networks A-D 104-110. The network devices 124, 126, and 128 may represent edge servers or devices that separate the core network 102 from the networks A-D 104-110. The core network 102 including the network devices 124-132 and the communications management system 122 may be interconnected and representative of a fiber-optic backbone or core for the national communications network 100. For example, the core network 102 may be composed of any number of network segments including fiber optics that are controlled and managed by the communications management system 122.

In the illustrative embodiments, the formatting, conversion, or translation between standards is performed by network 102 including network devices 124-128. The networks A-D 104-110 may be or include Layer 2 switches or Layer 2 switches, which may run different versions of signaling transfer point (STP) protocols or multi protocol label switching (MPLS) enabled Layer 2/Layer 3 network devices which may run different interior gateway protocols (i.e. open shortest path first (OSPF), intermediate system to intermediate system (IS-IS)) than the national core network 102 (e.g. may only run ISIS). The network devices 124-128 may be edge servers, Layer 2 switches, and Layer 3 MPLS routers including other advanced network devices. The networks A-D 104-110 may also run LDP-VPLS or BGP-VPLS. In one embodiment, the conversion between standards may be performed by the core network 102. For example, the core network 102 may be or include a Layer 3 device that supports MPLS protocol with ISIS as the IGP.

In one embodiment, the core network 102 may further include network devices 130 and 132 that may represent network nodes. In one embodiment, the communications or connection paths through the core network 102 may be selected to the effectiveness of communications as is know in the art. The core network 102 may include any number of network devices, nodes, segments, edge devices, or other components that are not specifically shown for purposes of simplicity.

The communications between the networks A-D 104-110 through the core network 102 allows a service provider operating the national network 100 to present enhanced service offerings. In particular, a customer utilizing network A 104 may not be required to utilize equipment or vendors associated with the standard utilized by the core network 102. As a result, the operator or service provider for the networks A-D 104-110 may utilize vendors, equipment, and standards that are optimal for that particular network. Common vendors that may provide equipment and services for the core network 102 and networks A-D 104-110 may include Juniper, Alcatel-Lucent, Cisco, Ciena, Calix, Adtran, and others In one embodiment, the core network 102 is implemented utilizing devices, systems, and software from Juniper Networks, such as the Juniper MX960s platform and equivalent future Juniper platforms. A process for determining the minimal interoperability (or least-common denominator functionality) and authorization may be utilized for the core network 102 and the networks A-D 104-110. The defined standard may be utilized as the core standard to which each of the standards utilized by the networks A-D 104-110 must be converted to access the core network 102.

In one embodiment, the technologies utilized may include border gateway protocol (BGP) 4, label distribution protocol (LDP) virtual private LAN service (VPLS), PWE3, Layer 2 virtual local area network (VLAN) switching, provider backbone bridging (PBB), and other similar technologies. For example, network B 106 may connect to the core network 102 using a BGP-based VPLS instance. In one example, the core network 102 may be running BGP VPLS natively and a connection to network B 106 may be facilitated by using BGP VPLS across both networks.

In another example, network C 108 may utilized LDP VPLS or targeted LDP (TLDP) as a standard. LDP may label packets with a network path and a VPN designating a customer or user to which a packet or communication belongs. In another example, network D 110 may utilize a layer 2 VLAN Ethernet domain handoff instead of using BGP VPLS or LDP VPLS. In one embodiment, communications originating or routed through network C 108 in Florida are converted from LDP VPLS to BGP VPLS by the core network (i.e. network device 126) and then communicated across the core network 102 to network D 110 in Las Vegas where the core network (i.e. network device 128) converts the BGP VPLS formatted communication to a layer 2 VLAN communication interoperable with network D 110.

The national network 100 offers Ethernet service between the regions represented by the networks A-D 104-110. For example, the same features that are provided in network A 104 may also be provided in network D 110 because of the conversion between the standards required by communication across the core network 102. Furthermore, the end-to-end Ethernet communications may be at layer two of the OSI model, allowing the national network 100 to appear as a large local area network (LAN). Additional protocols, such as IPv4, IPv6, and other legacy protocols may then be utilized on top of those Ethernet communications.

The core network 102 is pre-provisioned to use the core standard allowing the individual networks A-D 104-110 and new networks to be provisioned for service in an automated or manual set-up. In one embodiment, the communications management system 122 may establish resources for performing conversion between the format utilized by the regional metro Ethernet network and the core network 102. The illustrative embodiments allow networks to be amalgamations of different standards. As a result, no one vendor is given preeminence ensuring competition and prices remain competitive.

Figure 2:
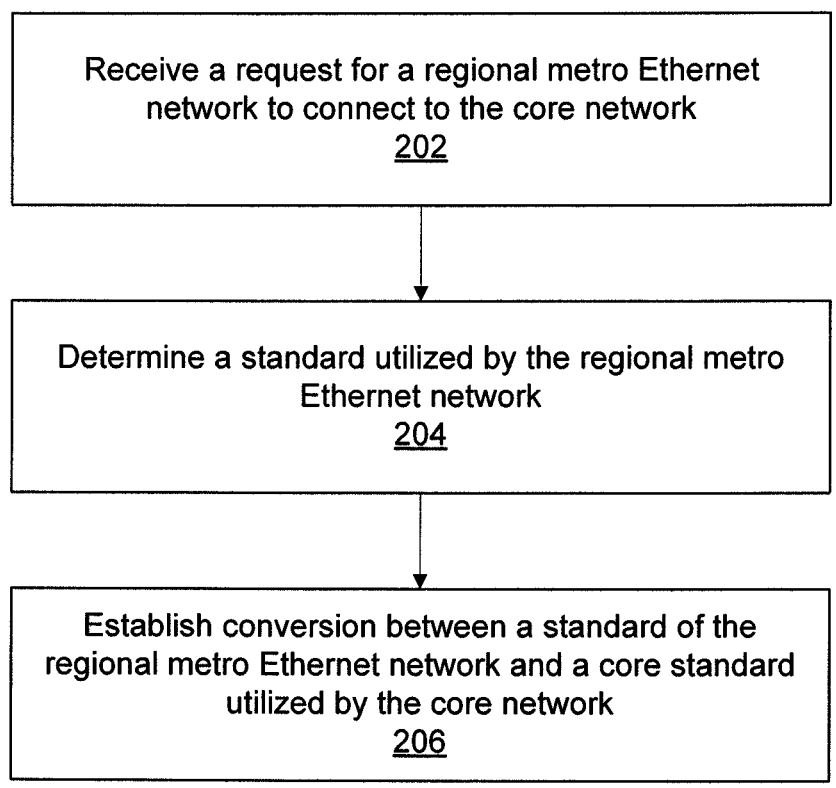
FIG. 2 is a flowchart of a process for establishing communications with a new communications network in accordance with an illustrative embodiment.

FIG. 2 is a flowchart of a process for establishing communications with a new communications network in accordance with an illustrative embodiment. The process of FIG. 2 may be performed by a network device, system, or user controlled by a service provider operating a core network. The process of FIG. 2 may represent a manual or automated process.

The process of FIG. 2 may begin by receiving a request for a regional metro Ethernet network to connect to a core network (step 202). The regional metro Ethernet network may be an existing, retrofitted, or newly created network that one or more service providers are interfacing with the core network. In one embodiment, the regional network may need a connection to the core network for long-haul services and increased bandwidth capacity to different regions, destinations, or areas accessible through the core network. In one embodiment, the request may represent an agreement between service providers to provide access to a core network for enhancing communications.

Next, the network device determines a standard utilized by the regional metro Ethernet network (step 204). The regional metro Ethernet network may have one or more standards that are utilized and one or more interfaces to the core network that may need to be evaluated or configured. In one example, the network device may determine whether running an xSTP protocol (for VLANs), VPLS LDP, or VPLS BGP. The determination of step 204 may be utilized in the process of FIG. 2 or 3 to determine the type of multi-home communications, VLAN terminations, LDP inter-workings, routing, redundancy processing, or other conversion issues that may exist between the regional metro Ethernet network and the core network.

Next, the network device establishes conversion between a standard of the regional metro Ethernet network and a core standard utilized by the core network (step 206). In one embodiment, the core network may be configured to perform conversion between the communications standards. Configuration of the interface device or device of the core network may be configured for both incoming and outgoing communications. In other embodiments, incoming and outgoing communications may be channeled through separate devices or communications paths requiring multiple devices to be configured during the process of step 206.

During step 206, the network device may establish a least common denominator of functionality for communicating between the regional metro Ethernet network and the core network. The network device may validate that the regional metro Ethernet network and associated vendors/service provider are capable of communicating with the core network. In addition, features, services, and product offerings may need to be compatible with features provided by the other regional metro Ethernet networks communicating with the core network or with a standardized set of features established by the operator of the core network. For example, a vendor for the regional metro Ethernet network may be required to utilize a prescribed system and method for multi-cast distribution. The multi-cast distribution may follow the IEEE 802.1ak standard for performing multi-cast distribution. Instead of configuring an entire network to meet the standard of the core network, an interface device or edge device of the core network may perform the conversions. By provisioning only the end-points of the regional metro Ethernet network or core network efficiencies are created.

Figure 3:
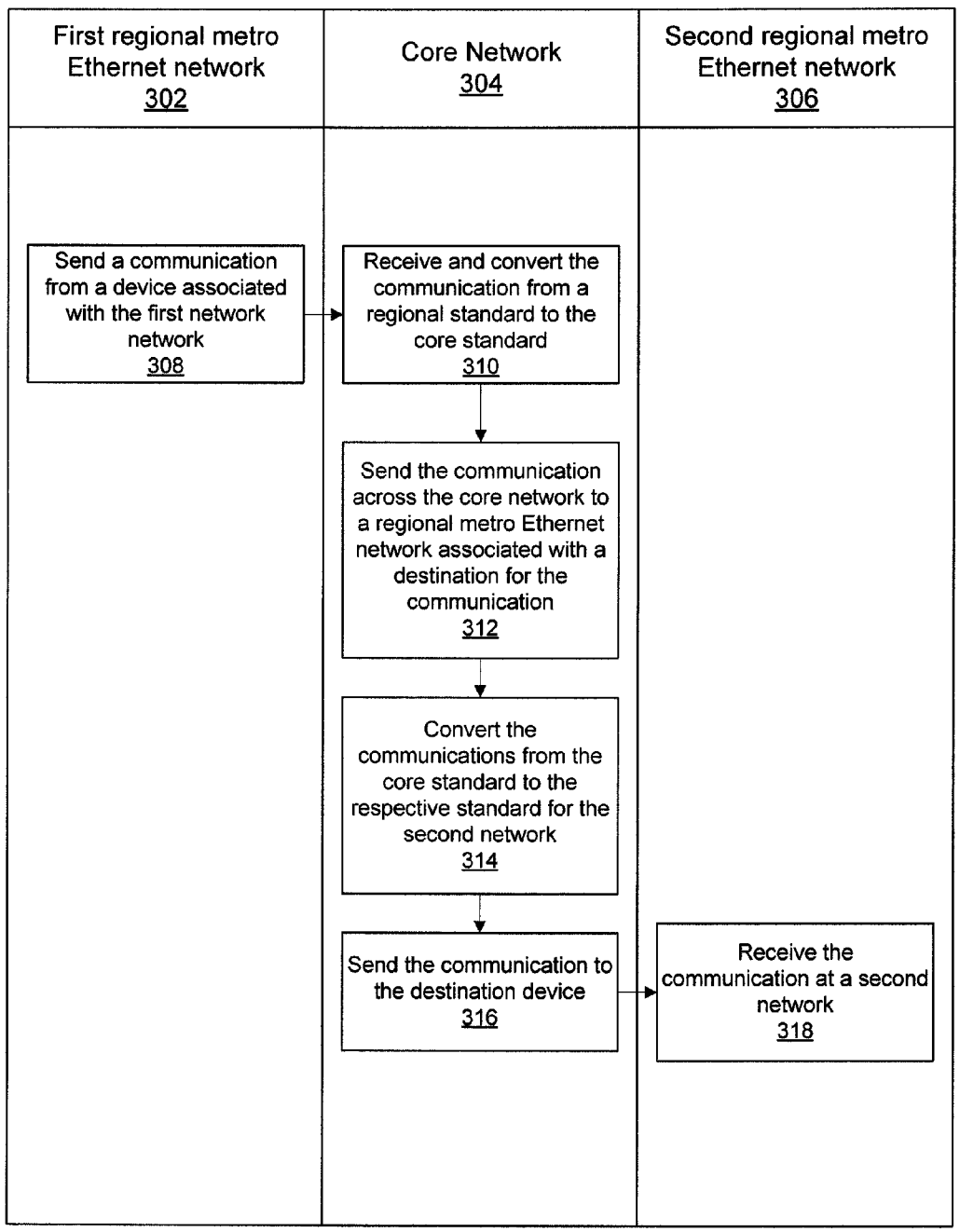
FIG. 3 is a flowchart of a process for stitching communications in accordance with an illustrative embodiment.

FIG. 3 is a flowchart of a process for stitching communications in accordance with an illustrative embodiment. The process of FIG. 3 may be implemented by a first regional metro Ethernet network 302 ("first network" 302), a core network 304, and a second regional metro Ethernet network ("second network" 304). Although shown for only three networks, a network system implementing this method may be utilized for numerous regional networks sending millions of communications simultaneously across the core network 304.

The process of FIG. 3 may begin by receiving a communication from a device associated with the first network 302 (step 308). The device may be a hardware device, such as a router or switch. During the process of step 308, the first network may receive the communication and route the communication through the first network into the core network through one or more interfaces.

Next, the core network 304 receives the communication and converts the communication from a regional standard to a core standard (step 310). The regional standard is a communications standard utilized by the first network 302 and the core standard is a uniform standard utilized for communications through the core network 304. The conversion may be performed by an edge device of the core network 304 configured to interface with the first network 302.

Next, the core network 304 sends the communication across the core network 304 to a second network 306 associated with a destination for the communication (step 312). Next, the core network 304 converts the communications from the core standard to the respective standard for the second network (step 314). The conversion of step 314 may be performed by a second edge device. The core network 304 also sends the communication to the destination device (step 316).

Next, the second network 306 receives the communication (step 318). During step 318, the second network may further route the communication to the destination device for delivery.

The illustrative embodiments allow regional networks that may utilize region specific or differing standards to stitched to the core network for enhancing communications efficiencies. In particular, smaller communications service providers may stitch together regional metro Ethernet networks utilizing different legacy vendors to form a competitive national network.

The previous detailed description is of a small number of embodiments for implementing the invention and is not intended to be limiting in scope. The following claims set forth a number of the embodiments of the invention disclosed with greater particularity.

What is claimed:

1. A method for stitching Ethernet networks, the method comprising:
   defining a core standard utilized by a core network, wherein the core standard is border gateway protocol (BGP) based virtual private local area network service (VPLS) with multi-home capability;
   receiving communications from a first communications network in at least a first regional standard, wherein the first regional standard includes one of a label distribution protocol (LDP) based VPLS, BGP based virtual private local area network service, or a layer 2 virtual local area network communication standard;
   identifying the first regional standard used in the communications;
   converting the communications from the first regional standard to the core standard based at least in part on a least common denominator for communications between the first network and the core network;
   sending the communications converted to the core standard across the core network, the core network in communication with the first communications network and a second communications network associated with a destination for the communications, the core network utilizing the core standard, wherein the first and second communications networks are regional metro Ethernet networks, and wherein the core network is a national metro Ethernet network;
   identifying a second regional standard, different from the first regional standard, used by the second communications network; and
   converting the communications from the core standard to the second regional standard utilized by the second communications network; and
   requiring each of the first and second communications networks to support conversion of the communications to and from the core standard.

2. The method according to claim 1, wherein edge devices of the core network perform the converting.

3. The method according to claim 2, further comprising:
   automatically provisioning a new network to communicate with the core network utilizing the core standard by provisioning available resources for converting between a standard utilized by the new network and the core standard, wherein the core network performs the converting.

4. The method according to claim 1, further comprising:
   associating the first and second regional standards with each of the communications in a database for performing the converting.

5. The method according to claim 1, further comprising:
   establishing the core standard with a plurality of service providers and vendors;
   validating that the plurality of networks and associated service providers and vendors are capable of communicating utilizing the core standard.

6. The method according to claim 1, further comprising:
   determining minimal operability to authorize communications with the core network, wherein the core standard includes basic functionality enabling communications functionality across the plurality of communications networks.

7. The method according to claim 1, further comprising:
routing communications through the core network between the first and second communications networks utilizing media access control (MAC) addresses associated with a user, the MAC addresses being registered with the core network.

8. The method according to claim 7, further comprising:
generating multi-cast traffic or broadcast traffic for one or more devices associated with the first or second communications networks;
routing the multi-cast traffic or broadcast traffic utilizing the MAC addresses for the one or more devices.

9. A system for Ethernet communications, the system comprising:
a first network having a first interface utilizing at least a first regional standard, wherein the first regional standard includes one of a label distribution protocol (LDP) based virtual private local area network service (VPLS), a border gateway protocol (BGP) based virtual private local area network service, or a layer 2 virtual local area network communication standard;
a second network having a second interface utilizing at least a second regional standard;
a core network for sending communications comprising:
a first core network device in communication with the first network via the first interface;
a second core network device in communication with the second network via the second interface;
wherein a defined core standard is used by the first and second core network devices to communicate over the core network, the core standard being BGP based VPLS with multi-home capability,
wherein the first core network device is configured to receive communications from the first network, identify the first regional standard used in the communications, convert the communications from the first regional standard to the core standard based at least in part on a least common denominator for communications between the first network and the core network, and send the communications over the core network to the second core network device, wherein the second network is associated with a destination of the communications,
wherein the second core network device is configured to identify the second regional standard, and convert the communications from the core standard to the second regional standard, the second regional standard being different from the first regional standard;
wherein each of the first and second network are required to support conversion of the communications to and from the core standard; and
wherein the first and second networks are regional metro Ethernet networks, and the core network is a national metro Ethernet network.

10. The system according to claim 9, wherein the first and second core network devices comprise edge devices of the core network that perform the converting.

11. The system according to claim 9,
wherein the first and second networks perform the conversion of the communications to the core standard and the conversion from the core standard to the second regional standard respectively.

12. The system according to claim 9, wherein the core network associates the first regional standard and the second regional standard with the communications in a database for performing the conversion.

13. A core network comprising:
a plurality of network devices, each of the plurality of network devices including:
a processor for executing a set of instructions; and
a memory for storing the set of instructions, wherein the set of instructions are configured to:
define a core standard utilized by a core network, wherein the core standard is border gateway protocol (BGP) based virtual private local area network service (VPLS) with multi-home capability;
receive communications from a first communications network in at least a first regional standard, wherein the first regional standard includes one of a label distribution protocol (LDP) based VPLS, a BGP based virtual private local area network service, or a layer 2 virtual local area network communication standard;
identify the first regional standard used in the communications;
convert the communications from the first regional standard to a core standard based at least in part on a least common denominator for communicating over the core network;
send the communications converted to the core standard across the core network, the core network in communication with the first communications network and a second communications network associated with a destination for the communications, the core network utilizing the core standard;
identify a second regional standard, different from the first regional standard, used by the second communications network;
convert the communications from the core standard to the second regional standard utilized by the second communications network; and
require each of the first and second communications networks to support conversion of the communications to and from the core standard;
wherein the first and second communications networks are regional metro Ethernet networks, and wherein the core network is a national metro Ethernet network.

14. The core network according to claim 13, wherein the set of instructions are executed by edge devices included within the plurality of network devices.

15. The core network according to claim 13, wherein the core standard utilized by the core network is defined by a service provider of the core network.

16. The core network according to claim 13, wherein the core network associates the first and second regional standards with each of the communications in a database for performing the conversion.

17. A method for stitching Ethernet networks, the method comprising:
establishing a core standard for communications through a national metro Ethernet network, wherein a core network is a backbone of the national metro Ethernet network and wherein the core standard is defined as border gateway protocol (BGP) based virtual private local area network service (VPLS) with multi-home capability;
requiring that a plurality of communications networks support conversion of communications to the core standard to communicate through the core network; wherein the plurality of communications networks comprising a first communications network and a second communications network;

receiving communications from the first communications network in at least a first regional standard in response to authenticating the first communications network meets a least common denominator for using the core standard, wherein the first regional standard includes one of a label distribution protocol (LDP) VPLS, a BGP based virtual private local area network service, or a layer 2 virtual local area network communications standard;

identifying the first regional standard used in the communications;

converting the communications from the first regional standard to the core standard;

sending the communications converted to the core standard across the core network, the core network in communication with the first communications network and the second communications network associated with a destination for the communications, the core network utilizing the core standard;

identifying a second regional standard, different from the first regional standard, used by the second communications network; and converting the communications from the core standard to one of the at least two regional standards utilized by each of the plurality of communications networks receiving the communications in response to the communications reaching the plurality of communications networks.

* * * * *